US009648320B2

(12) United States Patent
Rajagopalan et al.

(10) Patent No.: US 9,648,320 B2
(45) Date of Patent: May 9, 2017

(54) METHODS AND SYSTEMS FOR PROCESSING CONTENT

(71) Applicant: Comcast Cable Communications, LLC, Philadelphia, PA (US)

(72) Inventors: Arun V. Rajagopalan, Huntingdon Valley, PA (US); Robert Gaydos, Harleysville, PA (US); Gerald Caracciolo, Cherry Hill, NJ (US)

(73) Assignee: Comcast Cable Communications, LLC, Philadelphia, PA (US)

( * ) Notice: Subject to any disclaimer, the term of this patent is extended or adjusted under 35 U.S.C. 154(b) by 0 days.

(21) Appl. No.: 13/774,306

(22) Filed: Feb. 22, 2013

(65) Prior Publication Data

US 2014/0240591 A1 Aug. 28, 2014

(51) Int. Cl.
| | |
|---|---|
| *H04N 7/10* | (2006.01) |
| *H04N 19/463* | (2014.01) |
| *H04N 21/431* | (2011.01) |
| *H04N 21/434* | (2011.01) |
| *H04N 21/4402* | (2011.01) |
| *H04N 7/01* | (2006.01) |

(52) U.S. Cl.
CPC ......... *H04N 19/00551* (2013.01); *H04N 7/01* (2013.01); *H04N 19/463* (2014.11); *H04N 21/4312* (2013.01); *H04N 21/4344* (2013.01); *H04N 21/4347* (2013.01); *H04N 21/440263* (2013.01)

(58) Field of Classification Search
CPC .. H04N 5/44543; H04N 21/84; H04N 21/482; H04N 21/4828; H04N 21/4821; H04N 21/4622; H04N 21/47214

USPC ............... 725/44, 50, 52, 53; 709/119, 219
See application file for complete search history.

(56) References Cited

U.S. PATENT DOCUMENTS

| | | | |
|---|---|---|---|
| 6,415,100 B1* | 7/2002 | Park ............................ 386/244 |
| 6,507,618 B1* | 1/2003 | Wee et al. ................ 375/240.16 |
| 6,542,546 B1* | 4/2003 | Vetro et al. .............. 375/240.12 |
| 6,697,425 B1 | 2/2004 | Nakagawa | |
| 6,697,567 B1 | 2/2004 | Suzuki | |
| 6,732,370 B1 | 5/2004 | Gordon et al. | |
| 6,791,548 B2 | 9/2004 | Dutta | |
| 6,845,485 B1* | 1/2005 | Shastri ............. G06F 17/30855 348/E5.112 |
| 7,020,839 B1* | 3/2006 | Hosoda ............ G06F 17/30569 348/E5.104 |
| 7,073,122 B1 | 7/2006 | Sedghi | |

(Continued)

OTHER PUBLICATIONS

Kurceren, R., et al. "Compressed domain video editing," Acoustics, Speech and Signal Processing, IEEE, pp. V441-V444 (2006).

(Continued)

*Primary Examiner* — Annan Shang
(74) *Attorney, Agent, or Firm* — Ballard Spahr LLP

(57) ABSTRACT

Methods and system for processing data are disclosed. One method can comprise receiving content data in a first format and context description data relating to a portion of the content data. The method may further comprise converting the portion of the content data to an intermediate format, and converting the portion of the content data from the intermediate format to a second format based at least in part upon the context description data.

18 Claims, 8 Drawing Sheets

(56) References Cited

U.S. PATENT DOCUMENTS

| | | | |
|---|---|---|---|
| 7,249,264 B2* | 7/2007 | Belknap | H04L 63/0428 713/165 |
| 7,281,260 B2 | 10/2007 | Puente | |
| 7,437,365 B2 | 10/2008 | Gauthier | |
| 7,444,663 B2 | 10/2008 | Fenwick, Jr. | |
| 7,762,274 B2* | 7/2010 | Wong | 137/219 |
| 7,827,238 B2 | 11/2010 | Klubertanz | |
| 8,037,496 B1* | 10/2011 | Begeja et al. | 725/53 |
| 8,078,960 B2 | 12/2011 | Chalecki | |
| 8,103,125 B2 | 1/2012 | Martin | |
| 8,209,724 B2* | 6/2012 | Rathod et al. | 725/53 |
| 8,245,033 B1* | 8/2012 | Shetty et al. | 713/160 |
| 8,457,311 B1* | 6/2013 | Schultz | H04N 7/167 380/200 |
| 8,695,048 B1* | 4/2014 | Kellicker | 725/91 |
| 8,874,777 B2* | 10/2014 | Ma | G06Q 30/0241 370/486 |
| 9,094,727 B1* | 7/2015 | Gordon | H04N 21/482 |
| 9,491,511 B2* | 11/2016 | Perez | G06Q 30/02 |
| 2001/0031006 A1 | 10/2001 | Wang | |
| 2004/0073941 A1 | 4/2004 | Ludvig et al. | |
| 2009/0232221 A1 | 9/2009 | Cheng et al. | |
| 2009/0324134 A1* | 12/2009 | Howell | G06F 17/30905 382/284 |
| 2010/0070608 A1* | 3/2010 | Hosur | G06F 17/3002 709/218 |
| 2010/0123830 A1* | 5/2010 | Vunic | 348/700 |
| 2010/0299709 A1* | 11/2010 | O'Connor | H04N 7/163 725/61 |
| 2011/0164673 A1* | 7/2011 | Shaffer | 375/240.01 |
| 2011/0282884 A1* | 11/2011 | Ma | G11B 27/309 707/741 |
| 2012/0011596 A1* | 1/2012 | Kim | G06F 21/10 726/30 |
| 2012/0082227 A1 | 4/2012 | Perera et al. | |
| 2012/0124177 A1* | 5/2012 | Sparks | G06Q 20/123 709/219 |
| 2012/0166289 A1* | 6/2012 | Gadoury | G06Q 30/0269 705/14.66 |
| 2012/0185693 A1* | 7/2012 | Chen | H04N 21/41407 713/168 |
| 2012/0191805 A1* | 7/2012 | Fee | H04N 21/2343 709/217 |
| 2012/0203867 A1* | 8/2012 | Furbeck | H04L 65/4084 709/219 |
| 2013/0091251 A1* | 4/2013 | Walker | H04N 21/6125 709/219 |
| 2013/0114744 A1* | 5/2013 | Mutton | H04N 19/40 375/240.26 |
| 2013/0198770 A1* | 8/2013 | Xiong | H04N 21/654 725/25 |

OTHER PUBLICATIONS

Extended European Search Report issued Jan. 10, 2014 for European Patent Application No. 14155941.9, filed on Feb. 20, 2014 and published as EP 2770743 on Aug. 27, 2014 (Inventor—Rajaopalan; Applicant—Comcast Cable Comm. LLC;) (pp. 1-9).

* cited by examiner

METHODS AND SYSTEMS FOR PROCESSING CONTENT

BACKGROUND

Data can be communicated in various forms over various communication mediums. Data, such as video, can often be modified from a first format to include supplemental content such as overlays, icons, menus, and the like. An encoded video may be completely decoded to a spatial domain; modifications, such as adding supplemental content, are implemented in the spatial domain; and the video is re-encoded for distribution to an end-user. The process of completely decoding the video in order to implement changes and/or add content for each end-user or device is both processor and time intensive. These and other shortcomings are identified and addressed by the disclosure.

SUMMARY

It is to be understood that both the following summary and the following detailed description are exemplary and explanatory only and are not restrictive, as claimed. Provided are methods and systems for, in one aspect, encoding data. Provided are methods and systems for, in another aspect, selectively processing data based upon contextual data.

In an aspect, methods can comprise receiving content data in a first format and receiving context description data, which can be any type of data related to at least a portion of the content data. The content data can be converted to an intermediate format. As an example, the conversion of the content data to the intermediate format can be based at least in part on the context description data. As a further example, the portion of the content data relating to the context description data can be converted to the intermediate format. The content data in the intermediate format can be modified, for example, to include supplemental data. The portion of the content data in the intermediate format can be converted to a second format. As an example, the conversion of the content data to the second format can be based at least in part on the context description data. As a further example, the content data in the second format can be rendered via a downstream device such as a user device.

In an aspect, methods can comprise converting content data having a first format into one or more of content data having an intermediate format and context description data relating to at least a portion of the content data. The portion of the content data based upon the context description data can be processed, e.g. encoded. As an example, the portion of the content data based upon the context description data can be encoded for distribution to one or more downstream devices. As a further example, the encoded portion of the content data can be rendered via a downstream device such as a user device.

In an aspect, context description data can be determined. As an example, the context description data can relate to a content data having a first format. As a further example, the content data can be converted from a first format into an intermediate format. The context description data and converted content data can be transmitted to an encoder. In an aspect, the encoder can process a requisite portion of the converted content data based upon the context description data.

Additional advantages will be set forth in part in the description which follows or may be learned by practice.

The advantages will be realized and attained by means of the elements and combinations particularly pointed out in the appended claims.

BRIEF DESCRIPTION OF THE DRAWINGS

The accompanying drawings, which are incorporated in and constitute a part of this specification, illustrate embodiments and together with the description, serve to explain the principles of the methods and systems.

DETAILED DESCRIPTION

Figure 1:
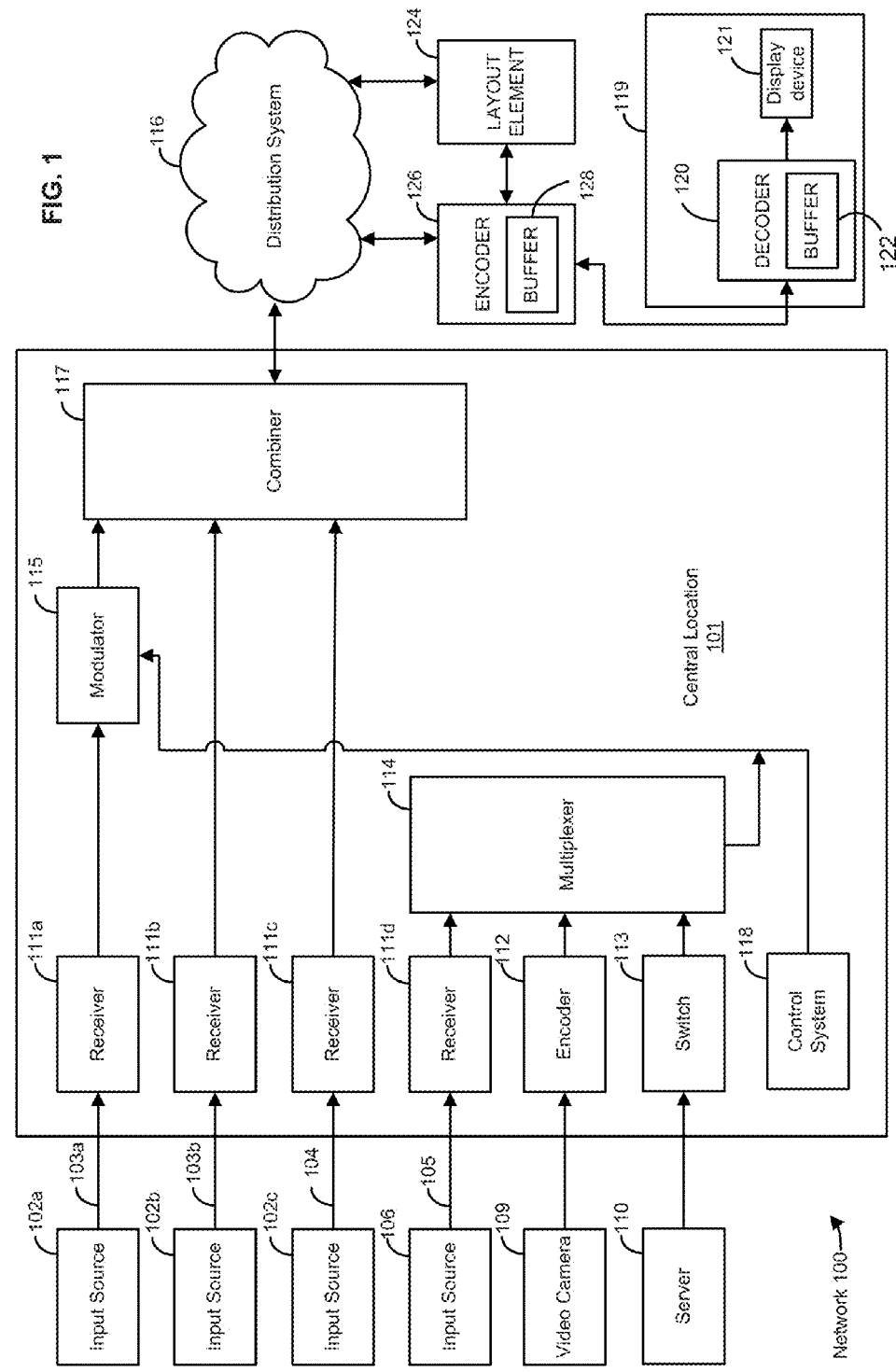
FIG. 1 is a block diagram of an exemplary network.

Before the present methods and systems are disclosed and described, it is to be understood that the methods and systems are not limited to specific methods, specific components, or to particular implementations. It is also to be understood that the terminology used herein is for the purpose of describing particular embodiments only and is not intended to be limiting.

As used in the specification and the appended claims, the singular forms "a," "an," and "the" include plural referents unless the context clearly dictates otherwise. Ranges may be expressed herein as from "about" one particular value, and/or to "about" another particular value. When such a range is expressed, another embodiment includes from the one particular value and/or to the other particular value. Similarly, when values are expressed as approximations, by use of the antecedent "about," it will be understood that the particular value forms another embodiment. It will be further understood that the endpoints of each of the ranges are significant both in relation to the other endpoint, and independently of the other endpoint.

"Optional" or "optionally" means that the subsequently described event or circumstance may or may not occur, and that the description includes instances where said event or circumstance occurs and instances where it does not.

Throughout the description and claims of this specification, the word "comprise" and variations of the word, such as "comprising" and "comprises," means "including but not limited to," and is not intended to exclude, for example, other components, integers or steps. "Exemplary" means "an example of" and is not intended to convey an indication of a preferred or ideal embodiment. "Such as" is not used in a restrictive sense, but for explanatory purposes.

Disclosed are components that can be used to perform the disclosed methods and comprise the disclosed systems. These and other components are disclosed herein, and it is understood that when combinations, subsets, interactions, groups, etc. of these components are disclosed that while specific reference of each various individual and collective combinations and permutation of these may not be explicitly disclosed, each is specifically contemplated and described herein, for all methods and systems. This applies to all aspects of this application including, but not limited to, steps in disclosed methods. Thus, if there are a variety of additional steps that can be performed it is understood that each of these additional steps can be performed with any specific embodiment or combination of embodiments of the disclosed methods.

The present methods and systems may be understood more readily by reference to the following detailed description of preferred embodiments and the examples included therein and to the Figures and their previous and following description.

As will be appreciated by one skilled in the art, the methods and systems may take the form of an entirely hardware embodiment, an entirely software embodiment, or an embodiment combining software and hardware aspects. Furthermore, the methods and systems may take the form of a computer program product on a computer-readable storage medium having computer-readable program instructions (e.g., computer software) embodied in the storage medium. More particularly, the present methods and systems may take the form of web-implemented computer software. Any suitable computer-readable storage medium may be utilized including hard disks, CD-ROMs, optical storage devices, or magnetic storage devices.

Embodiments of the methods and systems are described below with reference to block diagrams and flowchart illustrations of methods, systems, apparatuses and computer program products. It will be understood that each block of the block diagrams and flowchart illustrations, and combinations of blocks in the block diagrams and flowchart illustrations, respectively, can be implemented by computer program instructions. These computer program instructions may be loaded onto a general purpose computer, special purpose computer, or other programmable data processing apparatus to produce a machine, such that the instructions which execute on the computer or other programmable data processing apparatus create a means for implementing the functions specified in the flowchart block or blocks.

These computer program instructions may also be stored in a computer-readable memory that can direct a computer or other programmable data processing apparatus to function in a particular manner, such that the instructions stored in the computer-readable memory produce an article of manufacture including computer-readable instructions for implementing the function specified in the flowchart block or blocks. The computer program instructions may also be loaded onto a computer or other programmable data processing apparatus to cause a series of operational steps to be performed on the computer or other programmable apparatus to produce a computer-implemented process such that the instructions that execute on the computer or other programmable apparatus provide steps for implementing the functions specified in the flowchart block or blocks.

Accordingly, blocks of the block diagrams and flowchart illustrations support combinations of means for performing the specified functions, combinations of steps for performing the specified functions and program instruction means for performing the specified functions. It will also be understood that each block of the block diagrams and flowchart illustrations, and combinations of blocks in the block diagrams and flowchart illustrations, can be implemented by special purpose hardware-based computer systems that perform the specified functions or steps, or combinations of special purpose hardware and computer instructions.

As described in greater detail below, provided are methods and systems for controlling content transmitted to a user location. In an aspect, a data stream transmitted to the user location can comprise a repeatedly embedded placement signal to indicate that a particular content should be transmitted to the user location.

FIG. 1 illustrates various aspects of an exemplary network environment in which the present methods and systems can operate. Some aspects of the present disclosure relate to methods and systems for content control. Those skilled in the art will appreciate that present methods may be used in systems that employ both digital and analog equipment. One skilled in the art will appreciate that provided herein is a functional description and that the respective functions can be performed by software, hardware, or a combination of software and hardware.

The network 100 can comprise a central location 101 (e.g., a control or processing facility in a fiber optic network, wireless network or satellite network, a hybrid-fiber coaxial (HFC) content distribution center, a processing center, headend, etc.), which can receive content (e.g., data, input programming) from multiple sources. The central location 101 can combine the content from the various sources and can distribute the content to user locations, such as location 119, via distribution system 116.

In an aspect, the central location 101 can receive content from a variety of sources 102a, 102b, 102c. The content can be transmitted from the source to the central location 101 via a variety of transmission paths, including wireless (e.g. satellite paths 103a, 103b) and terrestrial path 104. The central location 101 can also receive content from a direct feed source 106 via a direct line 105. Content may also be created at the central location 101. Other input sources can comprise capture devices such as a video camera 109 or a server 110. The signals provided by the content sources can comprise a single content item or a multiplex that comprises several content items.

The central location 101 can comprise one or a plurality of receivers 111a, 111b, 111c, 111d that are each associated with an input source. For example, MPEG encoders such as encoder 112, are included for encoding/transcoding local content or a video camera 109 feed, terrestrial receiver, or broadcast receiver. As a further example, a data packaging device, such as a fragmentor, can be integrated with the encoder 112 (or separate and in communication with the encoder 112) to package the encoded/transcoded content. In an aspect, the encoder 112 and/or fragmentor can repeatedly embed markers, flags, and signals into the content data stream for processing by downstream devices. A switch 113 or a network can provide access to server 110, which can be, for example, a pay-per-view server, a data server, an internet router, a network system, and/or a phone system. Some signals may require additional processing, such as signal multiplexing or transcoding, prior to being modulated. Such multiplexing can be performed by multiplexer (mux) 114.

The central location 101 can comprise one or a plurality of modulators, 115a, 115b, 115c, and 115d, for interfacing to the distribution system 116. The modulators can convert the received content into a modulated output signal suitable for transmission over the distribution system 116. The output signals from the modulators can be combined, using equipment such as a combiner 117, for input into the distribution system 116.

A control system 118 can permit a system operator to control and monitor the functions and performance of network 100. The control system 118 can interface, monitor, and/or control a variety of functions, including, but not limited to, the channel lineup for the television system, billing for each user, and/or conditional access for content distributed to users. Control system 118 can provide input to the modulators for setting operating parameters, such as system specific MPEG table packet organization or conditional access information. The control system 118 can be located at central location 101 or at a remote location.

The distribution system 116 can distribute signals from the central location 101 to user locations, such as user location 119. The distribution system 116 can be an optical fiber network, a coaxial cable network, a hybrid fiber-coaxial network, a wireless network, a satellite system, a direct broadcast system, or any combination thereof. There can be a multitude of user locations connected to distribution system 116. At user location 119, a decoder 120, such as a gateway or communications terminal (CT) can decode, if needed, the signals for display on a display device, such as on a display device 121 such as a television set (TV), a mobile device, or a computer monitor. Those skilled in the art will appreciate that the signal can be decoded in a variety of equipment, including an CT, a computer, a TV, a monitor, or satellite dish. In an exemplary aspect, the methods and systems disclosed can be located within, or performed on, one or more CT's, display devices 121, central locations 101. DVR's, home theater PC's, and the like. As an example, the decoder 120 can receive and process the embedded markers, flags, and signals in the content data stream for controlling a content received by the decoder 120.

In an aspect, the decoder 120 or communication terminal can comprise a buffer 122. As an example, the buffer 122 can comprise a memory or a storage device. As a further example, a number of the content fragments can be loaded into the buffer 122 and stored for playback or processing by the associated decoder 120. However, other data, content, and/or information can be stored in the buffer 122 such as advertisements and alternative content, for example. In an aspect, the buffer 122 can be separate from the decoder 120. For example, the buffer 122 can be located upstream of the decoder 120 and downstream of the distribution system 116. As a further example, the buffer 122 can store information to be transmitted to any number of decoders 120 or other recipient devices. Accordingly, the decoder 120 can retrieve the content fragments from the buffer 122 for playback without having to communicate with the distribution system 116, thereby reducing latency in playback. In an aspect, the decoder 120 can process a continuous streaming track, which can comprise audio, video, or other data from the distribution system 116 with a regular cadence (e.g., every two seconds, four seconds, ten seconds). Other data and tracks can be received and processed by the user devices.

In an aspect, user location 119 is not fixed. By way of example, a user can receive content from the distribution system 116 on a mobile device such as a laptop computer, PDA, smartphone, GPS, vehicle entertainment system, and/or portable media player. The network of FIG. 1 is illustrative only and other types of networks and configurations may be used to implement the disclosure.

In an aspect, one or more of a layout element 124 and an encoder 126 can be disposed upstream of the decoder 120. As an example, one or more of the layout element 124 and the encoder 126 can be configured to receive data, such as video, audio, images, overlays, menus, icons, and the like. As a further example, one or more of the layout element 124 and the encoder 126 can receive data from a data source such as a content provider, the central location 101, and/or the distribution system 116.

Figure 2A:
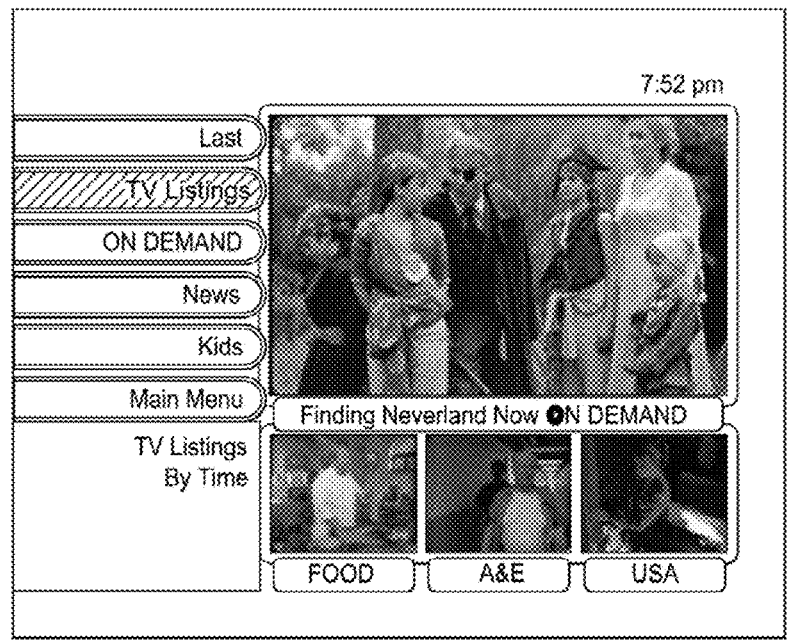
FIG. 2A is a representation of an exemplary presentation of content.

In an aspect, the layout element 124 can be configured to receive data such as content data (e.g., images, audio, video, menus, icons, banners, overlays, etc.). As an example, the layout element 124 can receive data in a first format, such as hypertext markup language (HTML). Other formats can be used such as Scalable Vector Graphics (SVG), Extended Markup Language (XML) with associated XML Style Sheets (XSS), Extended Post Script (EPS), Portable Document Format (PDF), proprietary document formats such as various presentation and document formats that can describe the layout of content, without having to combine the various content into pictures or video. As a further example, the data received by the layout element 124 can represent images, video, and/or frames of video, as illustrated in FIG. 2A. In an aspect, the first format of the data can comprise positional and presentation information for rendering an image, such as:

```
<div style="position: absolute; left: 0px; top: 0px;">
<img src="blanker5.png"/>
</div>
``` which illustrates style and positioning presentation in HTML for the image source file blanker5.png. Other positioning and presenting information can be represented by the first format. Any number of images and/or data points can be managed by the data in the first format. The layout element 124 can be configured receive content data from a plurality of data sources.

Figure 2B:
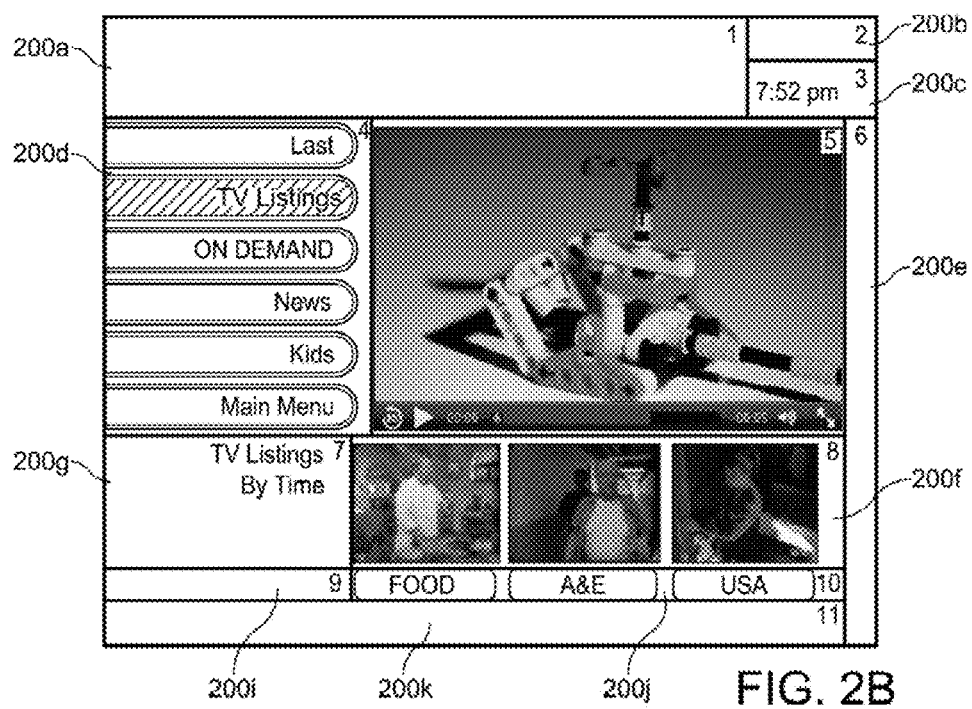
FIG. 2B is a representation of an exemplary presentation of data, showing a layout of the content.

In an aspect, the layout element 124 can be configured to determine a context description data relating to the data having the first format. As an example, the context description data can comprise information relating to a layout of data points (e.g., images, video frames, icons, motion, etc.) represented by the data received by the layout element 124. As another example, FIG. 2B illustrates a layout of a plurality of content components 200a-k, which can be represented by the context description data. As a further example, the context description data can comprise information relating to component list, location information, styling information, movement information, vector operations, vector graphics, excluded regions, relative encoding sensitivity of different regions, an identifier (e.g., file locator, buffer pointer, etc.), a type or classifier of data, a time element, a quality of encoding and/or presentation desired, a size, and/or a position.

In an aspect, one or more of the content components 200a-k can represent a region of rendered content. As an example, the context description data associated with one or more of the content components 200a-k can represent a type, quality, contextual description, and the like. As another example, the type can comprise one or more of a static image, text, video, animation, and the like. As yet another example, the quality can comprise classifiers such as soft image, crisp image, video, text, and the like. As a further example, the description can comprise an identifier or pointer to a memory or buffer, a rendered position, a rendered size, and a time the encoder can expect the associated content components 200a-k to change. In another aspect, the context description data can be processed to determine the level of processing required by the encoder 126. In an aspect, the encoder 126 may partially decode the content data, apply changes to the decoded content data, and re-encode the content data (with the changes) for downstream distribution.

In an aspect, the encoder 126 can be configured to receive one or more of the data (e.g., content data) and the context description data. As an example, the encoder 126 can process only a requisite portion of the content data based upon the context description data. As another example, the encoder 126 can selectively encode one or more content components 200a-k represented by the content data based upon the context description data. As a further example, for one of the content components 200a-k that is an image and does not change between several frames of a video, the encoder 126 can retrieve the content data from a buffer 128 rather than having to re-encode each of the content components 200a-k for every frame. In an aspect, the context description data can identify which of the content components 200a-k that require further processing by the encoder 126 and which of the content components 200a-k that can be retrieved from the buffer 128. As an example, the context description data can define processing instructions for the encoder 126 for various formats of data. As a further example, the encoder 126 can process the content data or other data into various formats such as MPEG-2, MPEG-4, H.264, Quicktime®, Adobe Flash®, Motion JPEG, and the like.

In an aspect, the methods and systems can utilize digital audio/video compression such as MPEG, or any other type of compression. The Moving Pictures Experts Group (MPEG) was established by the International Standards Organization (ISO) for the purpose of creating standards for digital audio/video compression. The MPEG experts created the MPEG-1 and MPEG-2 standards. The combined MPEG-1, MPEG-2, MPEG-4, and subsequent MPEG standards are hereinafter referred to as MPEG. In an MPEG encoded transmission, content and other data are transmitted in packets, which collectively make up a transport stream. In an exemplary aspect, the present methods and systems can employ transmission of MPEG packets. However, the present methods and systems are not so limited, and can be implemented using other types of transmission, and methods of storage.

The output of a single MPEG audio and/or video coder may be a transport stream, comprised of one or more elementary streams. An elementary stream is an endless near real-time signal. For convenience, the elementary stream may be broken into data blocks of manageable size, forming a packetized elementary stream (PES). These data blocks need header information to identify the start of the packets and must include time stamps because packetizing disrupts the time axis. For transmission and digital broadcasting, for example, several programs and their associated PESs can be multiplexed into a multi-program transport stream. A multi-program transport stream has a program clock reference (PCR) mechanism that allows transmission of multiple clocks, one of which is selected and regenerated at the decoder.

A multi-program transport stream is more than just a multiplex of data, audio and/or video PESs. In addition to the compressed audio, video and data, a transport stream may include metadata describing the bit stream. This includes the program association table (PAT) that lists every program in the multi-program transport stream. Each entry in the PAT points to a program map table (PMT) that lists the elementary streams making up each program. Some programs will be unencrypted, but some programs may be subject to conditional access (encryption), and this information is also carried in the metadata. The transport stream can be comprised of fixed-size data packets; for example, each containing 188 bytes. Each packet can carry a program identifier code (PID). Packets in the same elementary stream can all have the same PID, so that the decoder (or a demultiplexer) can select the elementary stream(s) it wants and reject the remainder. Packet continuity counts ensure that every packet that is needed to decode a stream is received. A synchronization system can be used so that decoders can correctly identify the beginning of each packet and deserialize the bit stream into words.

A content item, such as a program, can be a group of one or more streams, each with an unique PID that is used to identify the stream to which a packet belongs. For instance, a multi-program transport stream used in digital television might contain three programs, to represent three television channels. Suppose each channel consists of one video stream, one or two audio streams, and any necessary metadata. A receiver wishing to tune to a particular "channel" merely has to decode the payload of the PIDs associated with its program. It can discard the contents of all other PIDs.

In an aspect, the decoding of the payload (e.g., video) can comprise demultiplexing and/or dequantizing. As an example, demultiplexing can comprise separating the input SPTS into packets of video and audio. As a further example, ISO 13818-1 describes a method of multiplexing multiple elementary streams into a program stream or transport stream. In an aspect, the intermediate format can remove all packet encapsulation and multiplexing created according to 131818-1. For example, the MPEG-2 TS packets corresponding to Packet ID (PID) of video as described in the PMT of the component can be separated. In an aspect, each frame of video or field of video (e.g., pictures) can be stored as a contiguous stream of bytes. As an example, the elementary stream packetization can be de-packetized to the extent that each frame of video or field of video is a contiguous stream of bytes. In an aspect, audio can be stored as one or more of a packetized stream or as contiguous stream of bytes of audio frames. As an example, if a single content component comprises only audio, the audio can remain as a stream of MPEG-2 Transport Stream packets. Accordingly, only the Packet Identifier (PID) on the transport stream may be required to be changed during a re-multiplexing process.

Figure 3:
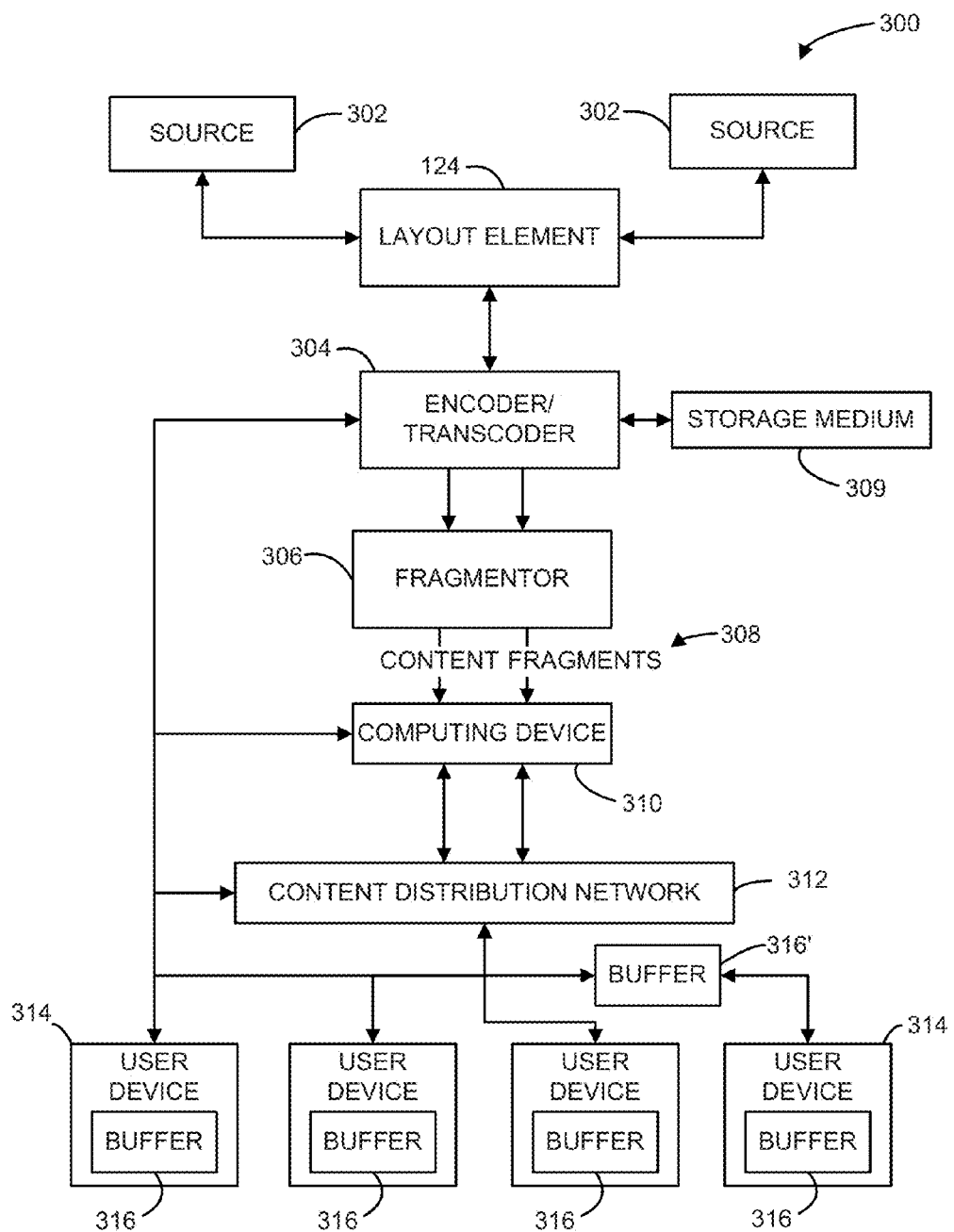
FIG. 3 is a block diagram of an exemplary system.

In an aspect, provided are methods and systems for controlling content transmitted to one or more devices. FIG. 3 is a block diagram of an exemplary content control system 300. The system 300 can comprise one or more data sources 302 for accessing and/or transmitting data, such as a data stream. An encoder 304 (e.g., encoder 126) can be in signal communication with the data sources 302. A fragmentor 306 can be in signal communication with the encoder 304. As an example, the encoder 304 and the fragmentor 306 can be integrated as part of a unitary device. However, the encoder 304 and the fragmentor 306 can be separate and distinct components.

In an aspect, the data sources 302 can comprise a content provider for providing one or more of audio content, video content, data, news feeds, sports programming, and advertisements. As an example, the data sources 302 can be configured to transmit the data (e.g., as a stream, fragments, files, overlays, etc.) to various end-users. In an aspect, one or more data source 302 can comprise an advertisement database having a plurality of advertisements stored therein or capable of accessing advertisement stored elsewhere.

As an example, one or more of the data sources 302 can comprise a network data feed transmitting the data stream to users such as subscribers or clients. As a further example, the one or more data sources 302 can be configured to transmit the data stream in a standard video format, such as, but not limited to, any of the Moving Picture Experts Group standards (e.g., MPEG-2, MPEG-4, a single MPEG-4 video encapsulated in an MPEG-2 transport stream over UDP MCAST, etc.), or any of the standards for audio and/or video, such as MP3. Quicktime, and Audio Video Interleave (avi). However, the encoder 304 can be configured to receive the data stream from any source having any format that can be encoded (or transcoded) into a format that is appropriate for streaming or otherwise transmitting.

The encoder 304 can be any device, system, apparatus, or the like to encode, decode, and/or transcode the data stream. In an aspect, the encoder 304 converts a single (high) bit rate to an output of multiple (lower) bitrates. As an example, the encoder 304 can convert the data stream from the input format received from the data source (such as MPEG-2, QAM, etc.) to an output format for distribution to consumers (such as MPEG-4). In an aspect, the encoder 304 can be a device, such as a transcoder, that conditions streaming data and/or changes it from one format to another. The encoder 304 can be configured to receive the data stream, or other type of signal, from one or more of the data source 302 and encode/transcode information onto the data stream. In an exemplary embodiment, the encoder 304 adds information to the signal relating to content fragments 308 or data blocks. In an aspect, a buffer or storage medium 309 can be in communication with the encoder 304 or integrated therewith. As an example, data received by the encoder 304 can be buffered or stored in the storage medium 309. As a further example, data blocks or content fragments 308 processed by the encoder 304 can be buffered or stored.

In an aspect, the fragmentor 306 can be in signal communication with the encoder 304 to receive the data stream therefrom. As an example, the fragmentor 306 and the encoder 304 are configured as a unitary device. However, the fragmentor 306 and the encoder 304 can be integrated or separate. In an aspect, fragmentor 306 conditions the data stream (or other data signal) for downstream distribution by a computing device 310, such as a server, through a content distribution network 312 to user devices 314 (e.g. the decoder 120). In an aspect, the computing device 310 can be an origin Hypertext Transfer Protocol (HTTP) server. However, other servers can be used, such as a rate adaptive streaming server. As an example, the fragmentor 306 can communicate with the computing device 310 using the POST method of the HTTP. As a further example, the computing device 310 can implement the functions described relative to the encoder 304 and/or the fragmentor. However, other protocols, configurations, and communication methods can be used.

In an exemplary embodiment, the fragmentor 306 separates or fragments the data stream into each of the content fragments 308 represented by the data stream based upon an information encoded onto the data stream by the encoder 304. In an additional exemplary embodiment, the fragmentor 306 accesses the information encoded/inserted in the data stream by the encoder 304 to define the content fragments 308 based on, among other things, boundaries, grouping, timing, or duration from the encoded data stream. Once the content fragments 308 are generated, the content fragments 308 can be transmitted to the content distribution network (CDN) 312 for delivery to the user devices 314 for consumption (e.g., playback). As an example, the computing device 310, CDN 312, and the user devices 314 can intercommunicate using the GET method of HTTP. However, other protocols and communication methods can be used.

In an aspect, one or more of the user devices 314 can comprise a buffer 316. As an example, the buffer 316 can comprise a memory or a storage device. As a further example, a number of the content fragments 308 can be loaded into the buffer 316 and stored for playback by the associated user device 314. Accordingly, the user device 314 can retrieve the content fragments 308 from the buffer 316 for playback without having to communicate with the CDN 312, thereby reducing latency in playback. In an aspect, the user device 314 can process a continuous streaming track, which can comprise audio, video, or other data from the computing device 310 with a regular cadence (e.g., every two seconds, four seconds, ten seconds). Other data, content, and/or information can be stored in the buffer 316 such as advertisements and alternative content, for example.

In an aspect, a buffer 316' can be separate from the user device 314. For example, the buffer 316' can be located upstream of the user device 314 and downstream of the CDN 312. As a further example, the buffer 316' can store information to be transmitted to any number of user devices 314 or other recipient devices. Accordingly, the user device 314 can retrieve the content fragments 308 from the buffer 316' for playback without having to communicate with the CDN 312, thereby reducing latency in playback.

In an aspect, the layout element 124 can be configured to receive data such as content data (e.g., images, audio, video, menus, icons, banners, overlays, etc.). As an example, the layout element 124 can receive content data from a plurality of data sources 302. As a further example, the layout element 124 can be configured to process the content data received by one or more data sources 302 to determine context description data associated with the content data. As such, the context description data can be processed to determine the level of processing required by the encoder 304. In an aspect, the encoder 304 may partially decode the content data, apply changes to the decoded content data, and re-encode the content data (with the changes) for downstream distribution.

Figure 4:
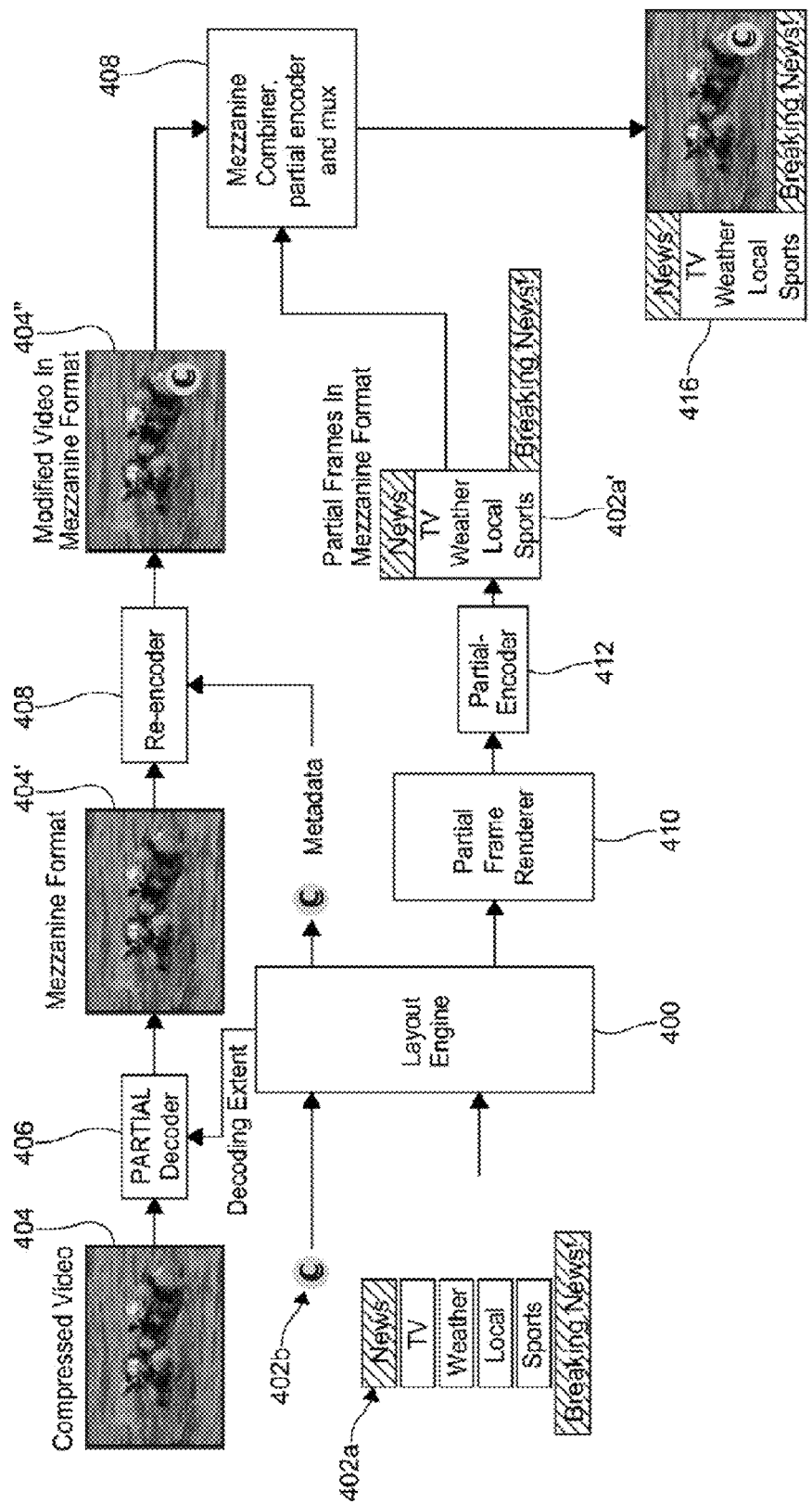
FIG. 4 is a block diagram of an exemplary system and data flow.

FIG. 4 illustrates an exemplary system and data flow in which the present methods and systems can operate. In an aspect, the process of modifying video data can be optimized by observing that the majority of the output is similar to the input. Accordingly, an encoder can decode only a portion of the video, thereby generating an intermediate format or "mezzanine format." The intermediate format can then be altered and the output format can be generated from the altered intermediate format.

In an aspect, the intermediate format can be implemented to minimize the amount of encoding required in a given process. For video data, the intermediate format can be used to overlay an icon or overlap menu bars or tickers on the video rendered from the video data. A traditional way of modifying an encoded video is to first decode the video data completely to the spatial domain, then apply the modifications (e.g., adding an icon) in the spatial domain, and then re-encode the complete video data for distribution.

The methods and systems of the present disclosure provide solutions that do not require the full decoding and re-encoding of data to modify the underlying data. For example, macro-blocks in an input video data can be selectively modified to render an overlayed icon on a portion of the rendered video. As a further example, the altered video comprising the overlayed icon can be combined with text and images in a subsequent encoding process, as illustrated in FIG. 4.

In an aspect, a layout engine 400 (e.g., layout element 124) can be configured to receive data such as content data 402a, 402b (e.g., images, audio, video, menus, icons, banners, overlays, etc.) from one or more sources. As an example, the layout engine 400 can be configured to process the received data to determine context description data associated with the received data. As such, the context description data can be processed to determine the level of processing (e.g., extent of decoding of a compressed video stream 404). In an aspect, a decoder 406 can partially decode an input, such as video 404, based on the context description data to generate a partially decoded video 404'. As an example, the partially decoded video 404' can comprise the intermediate format. In an aspect, an encoder 408 can apply changes to the partially decoded video 404' and can re-encode the partially decoded video 404' (with the content data 402b) for downstream distribution. As an example, content data 402b, such as an overlay, can be encoded with a portion of the partially decoded video 404' to result in a modified video 404". As a further example, the modified video 404" can be combined with other content data 402a to result in an output format 416 for presentation. In an aspect, content data 402a, such as images and text, can be encoded separately from the video 404 and combined with the modified video 404". As an example, one or more frames of content data 402a can be processed (e.g. rendered, encoded, arranged) via a renderer 410, an encoder 412, or a combination thereof to result in an intermediate format of encoded content data 402a' for combination with an intermediate format of the modified video 404". In an aspect, a computing device 414 such as a data combiner, encoder, a multiplexer, or the like, can receive the intermediate format of encoded content data 402a' and the intermediate format of the modified video 404" for combination and encoding as the output format 416 for presentation and/or distribution.

In an aspect, the decoding of the video can comprise demultiplexing and/or dequanitizing. As an example, demultiplexing can comprise separating the input SPTS into packets of video and audio. As a further example, ISO 13818-1, hereby incorporate herein by reference in its entirety, describes a method of multiplexing multiple elementary streams into a program stream or transport stream. In an aspect, the intermediate format can remove all packet encapsulation and multiplexing created according to 131818-1. For example, the MPEG-2 TS packets corresponding to Packet ID (PID) of video as described in the PMT of the component can be separated. In an aspect, each frame of video or field of video (e.g., pictures) can be stored as a contiguous stream of bytes. As an example, the elementary stream packetization can be de-packetized to the extent that each frame of video or field of video is a contiguous stream of bytes. In an aspect, audio can be stored as one or more of a packetized stream or as contiguous stream of bytes of audio frames. As an example, if a single content component comprises only audio, the audio can remain as a stream of MPEG-2 Transport Stream packets. Accordingly, only the Packet Identifier (PID) on the transport stream may be required to be changed during a re-multiplexing process.

In an aspect, the decoding of the video data can comprise processing a group of pictures (GOP) structure of the video. As an example, 1-frames can be decoded only to the extent that the macro-blocks covered by a modification to the I-frames can be extracted. As a further example, motion vectors in P-frames and B-frames can be decoded completely, to identify all macro-blocks or regions that will be affected due to addition of icons or partial overlay of elements. For example, in MPEG-2, the motion vectors of a macro-block may be restricted to refer only to other macro-blocks that are within a certain distance from said macro-block. In an aspect, the GOP structure can be processed to determine which macro-blocks refer to the portion of the video data that will be modified, for example, by supplemental data such as context description data. As an example, the DCT coefficients of the "affected" macro-blocks can be decoded. As a further example, in order to decode the affected macro-blocks, other macro-blocks in the same slice as the affected macro-blocks can be decoded. In an aspect, the affected macro-blocks in the P and B pictures can be re-encoded. As an example, re-encoding can comprise one or more of re-encoding the macro-blocks as intra-only macro-blocks, retaining the motion vectors and re-computing the residual coefficients, and performing a new motion vector search to create both new motion vectors and new DCT coefficients.

In an aspect, the quantization scale factor used for the first macro-block and the last macro-block of every slice of the video data can be stored. As an example, the quantization scale factor can be relied upon to re-encode macro-blocks of two adjacent components in separate slices or the same slice.

In an aspect, static components, such as pictures and text that do not overlay other frequently changing components such as videos, can be encoded only once for each content element to be displayed. Accordingly, the mezzanine format for static components can be MPEG-2 transport streams. As an example, the mezzanine format for static components can have a different stream of MPEG-2 packets for each of the I, P and B picture types.

In an aspect, for animations such as tickers, the mezzanine format can contain the same MPEG-2 transport stream packets for all frames of a certain type. As an example, when an animation covers a part of a slice or part of a macro-block, the ticker can be treated as an overlay icon. As a further example, if an animation and the video share parts of the same macro-block, then macro-blocks in the video can be recomputed.

In an aspect, when combining videos with different block samples, the mezzanine format can contain resampled blocks. As an example, resampling blocks can comprise converting all macro-blocks to the highest sampling. For example, if two videos, one that is 4:2:0 is to be combined with another video that is 4:4:4, then all macro-blocks of the 4:2:0 video can be resampled to 4:4:4 before being stored in the mezzanine format. Alternatively, a re-combiner can convert all 4:2:0 blocks to 4:4:4 blocks in real-time.

In an aspect, videos with different GOP structures can be processed by storing co-efficient data and motion-vector data in their fully decoded (but not inverted) forms in the mezzanine format. As an example, a mezzanine combiner or encoder can convert I Frames into P or B frames and P frames into B frames. As a further example, frames can be converted by adding null backward and/or forward motion vectors into every macro-block of the frames and partially re-encoding the macro-blocks. In an aspect, partial re-encoding can comprise encoding coefficients and motion vectors using variable length coding and creating slice and picture structures from the macro-blocks.

Figure 5:
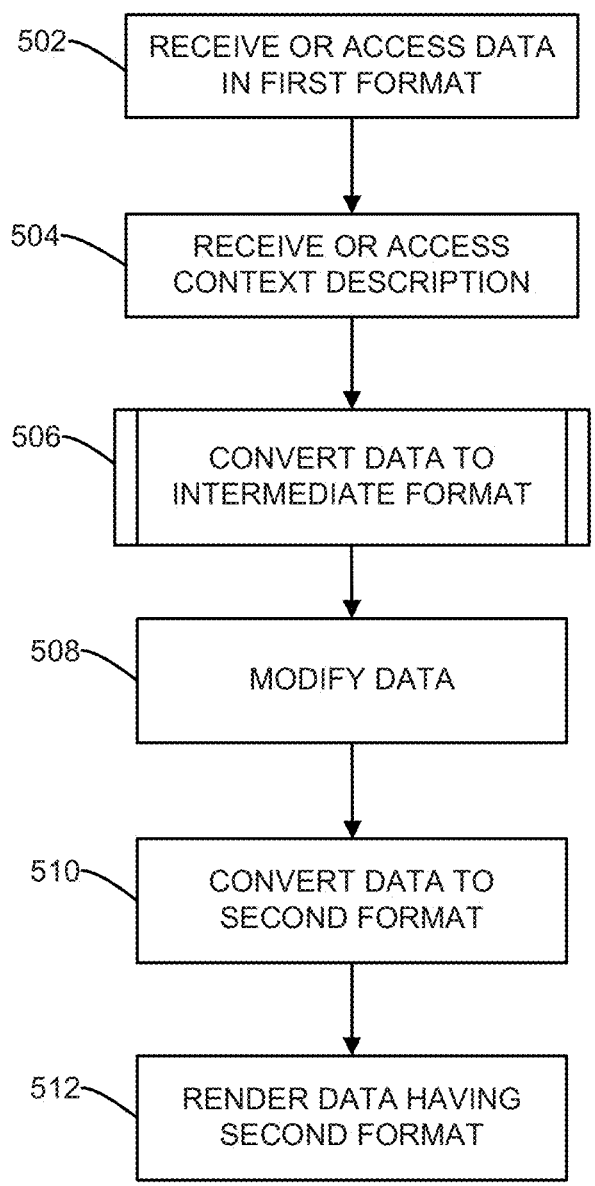
FIG. 5 is a flow chart of an exemplary method.

FIG. 5 illustrates an exemplary method for managing, presenting, and/or controlling content. In step 502, data such as content data can be accessed or otherwise received in a first format. In an aspect, the first format can be HTML, JPEG, MPEG, or the like. As an example, the content data can comprise one or more of audio, text, images, vectors, highlights, animations, video, and overlays.

In step 504, context description data (e.g., metadata) can be accessed or otherwise received. As an example, the context description data which can be any type of data and can relate to at least a portion of the content data. As a further example, the context description data can comprise one or more of a component list, location information, movement information, vector operations, vector graphics, included/excluded regions, and relative encoding sensitivity of different regions. In an aspect, vector graphics can comprise, for example, one or more of scalable vector graphics (SVG) included as part of the HTML, SVG as a separate stream or file in addition to the base HTML, vector graphics supplied through an API, such as OpenGL and the like.

In step 506, the content data or a portion thereof can be converted to an intermediate format, such as a mezzanine format. As an example, converting to the intermediate format can comprise at least a partial decoding of the first format and/or fragmenting or otherwise partitioning of the content data. As another example, converting to the intermediate format can comprise modifying the decoded portion of the content data. As a further example, the intermediate format can comprise partially encoded data which may be the results of partially decoding input MPEG-2 content.

In step 508, all or a portion of the content data can be modified. As an example, the portion of the content data that is converted (e.g., decoded) in the intermediate format can be modified. As a further example, supplemental content can be added to the content data.

In step 510, all or a portion of the content data can be converted from the intermediate format to a second format. As an example, the second format can be an MPEG format or a format suitable for IP delivery to a user device, etc. As a further example, converting from the intermediate format to a second format can comprise encoding at least a portion of the content data.

In step 512, the content data having the second format can be rendered. As an example, a decoder can receive the content data in the second format and can process the same for presenting content via one or more devices.

Figure 6:
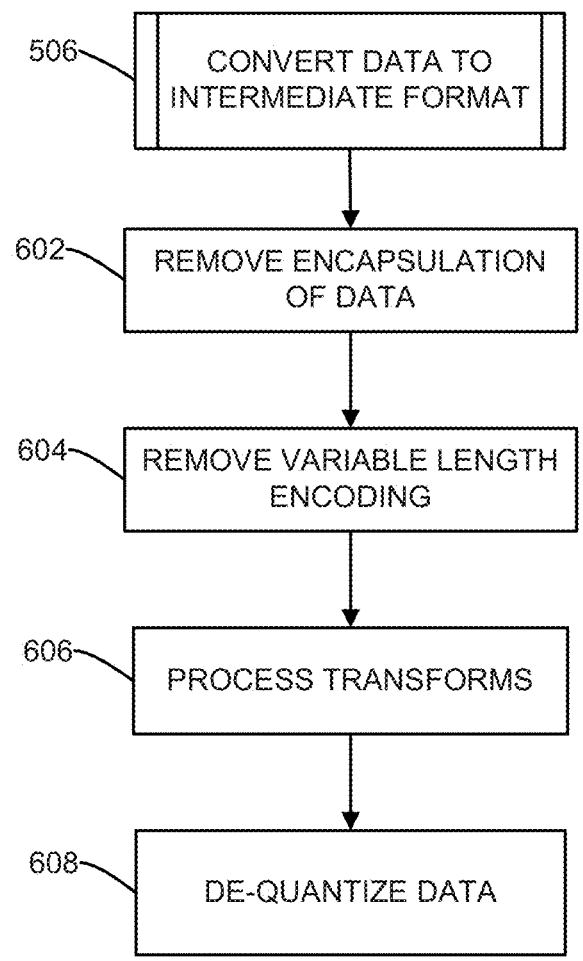
FIG. 6 is a flow chart of an exemplary method

FIG. 6 illustrates one example of a method for converting data to an intermediate format. The steps illustrated in FIG. 6 can be performed alone, or in combination with one or more other steps. In step 602, converting data to an intermediate format can comprise partial decoding of the content data. In an aspect, partial decoding can comprise removal of any encapsulation such as de-packetizing a transport stream into elementary video and audio streams.

In step 604, converting data to an intermediate format can comprise removing a variable length encoding (e.g. code) of the content data to make the encoding a fixed length.

In step 606, converting data to an intermediate format can comprise processing transforms. As an example, converting data to an intermediate format can comprise separating discrete cosine transforms (DCT) into an array and "exploding" the DCT. When DCT are encoded as per ISO 13818, only some of the coefficients are transmitted. For example, non-zero coefficients are not transmitted. Further coefficients are quantized and encoded to variable length. The quantized coefficients can be "undone," creating an array of 64 coefficients in fixed length format. As another example, converting data to an intermediate format can comprise conversion of macro-blocks from intra, intra P, P, or B type frames to B type frames or blocks.

In step 608, converting data to an intermediate format can comprise dequantizing at least a portion of the content data. In an aspect, quantization such as value mapping and/or vector mapping used in content encoding and clustering can be different between multiple screen elements that have to be combined. Thus, the input content description data can provide information relating to the extent to which each part of the content must be decoded (e.g., dequantized). For example, icons can be encoded heavily (poor definition), while text regions have to be encoded without much loss of definition. As a further example, the context description data can define the expected change of the components over time. For example. "Image @ (100, 100, 200, 200) is static till changed" can define a static image with no expectation of change for several frames, GOP or seconds.

Figure 7:
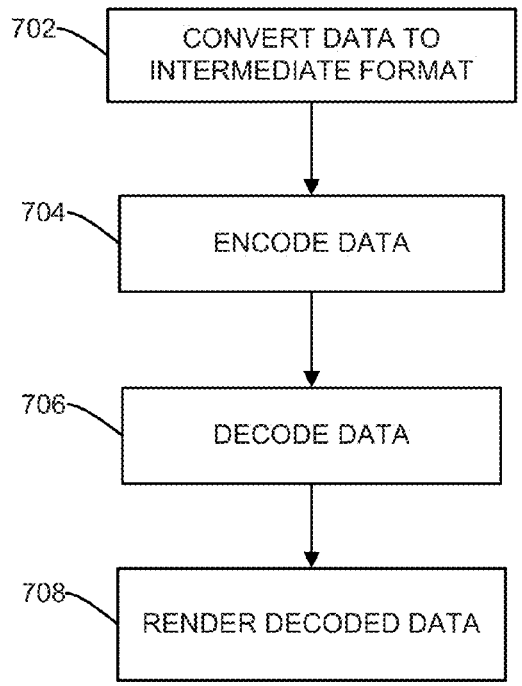
FIG. 7 is a flow chart of an exemplary method.

FIG. 7 illustrates an exemplary method for encoding data. In step 702, data having a first format can be converted into content data having an intermediate format and context description data relating to a portion of the content data. In an aspect, the data in the first format can be processed to extract the context description data.

In step 704, the portion of the content data based upon the context description data can be encoded. In an aspect, the context description data can provide information relating to the extent the content data should be encoded. For example, the content data in the intermediate format can comprise a portion that is decoded and/or manipulated. As such, the portion of the content data that is decoded and/or manipulated can be re-encoded for distribution.

In an aspect, encoding the content data can comprise repackaging composited video into a MPEG-2 Transport Stream and multiplexing the video with audio streams. As an example, for regions of the content data where there are no changes to the content component, the content component can be copied to the output. As a further example, the content component can be copied with one or more of the following transformations:
  a. Converting all macro-block types to the destination macro-block type. For example, if video is output using a P frame and the component video has an I frame at that instant, the I frame can be converted to a P frame. As a further example, the type of frame to be used for the output can be a heuristic, which can be an optimization of the processor time it takes to change all the components to the target frame type and the resulting number of bits in that picture; and
  b. Adding slice headers.

In an aspect, regions of the content data can comprise a single content component having portions of the content component covered by other content components (e.g., a cutout background picture with a video overlay). As an example, encoding content data can comprise changing the quantization of macro-blocks. As a further example, macro-blocks can be re-encoded by one or more of the following processes:
  i. completely re-encoding the DCT and adding null motion vectors to reconstruct the macro-block; and
  ii. adjusting and/or adding coefficients to the DCT to compensate for the motion vectors pointing to other content components.

In an aspect, for macro-blocks comprising pixels from multiple content components, the DCT can be inverse transformed to the original pixels. As such, the original pixels can be combined and transformed back into DCT. As an example, motion vectors can be determined to reduce the size of the macro-block.

In an aspect, for macro-blocks with known movements such as ticker bars at the bottom of the screen, and those represented by vectors like SVG, a macro-block may simply be motion vectors that refer to a macro block from a previous picture. In an aspect, for complete macro-blocks exhibiting no change between pictures, a p-only macro-block with motion vectors of magnitude zero can be transmitted.

In step 706, the re-encoded content data can be transmitted to a device such as a converter, decoder, terminal, or user device. As such, the re-encoded data can be decoded and rendered, as shown in step 708.

Figure 8:
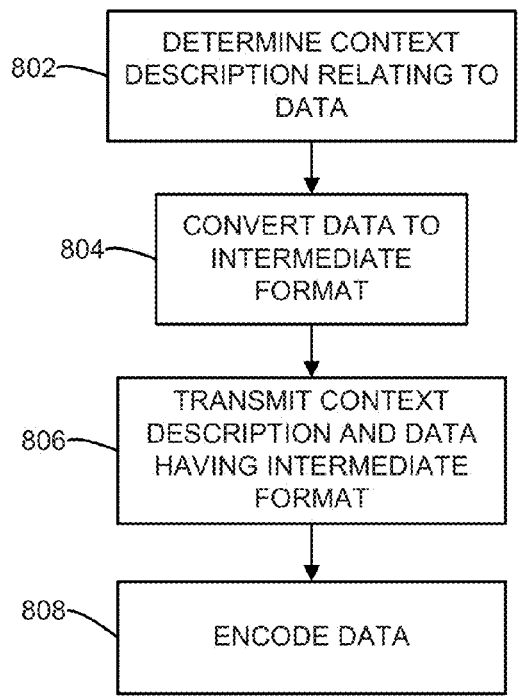
FIG. 8 is a flow chart of an exemplary method.

FIG. 8 illustrates an exemplary method for managing, presenting, and/or otherwise controlling content. In step

802, context description data can be determined. In an aspect, the context description data can relate to content data having a first format. In step 804, content data having the first format can be converted into an intermediate format. In step 806, the context description data and converted content data can be transmitted to a network device, such as an encoder. In step 808, the encoder can process a requisite portion of the converted content data based upon the context description data.

Figure 9:
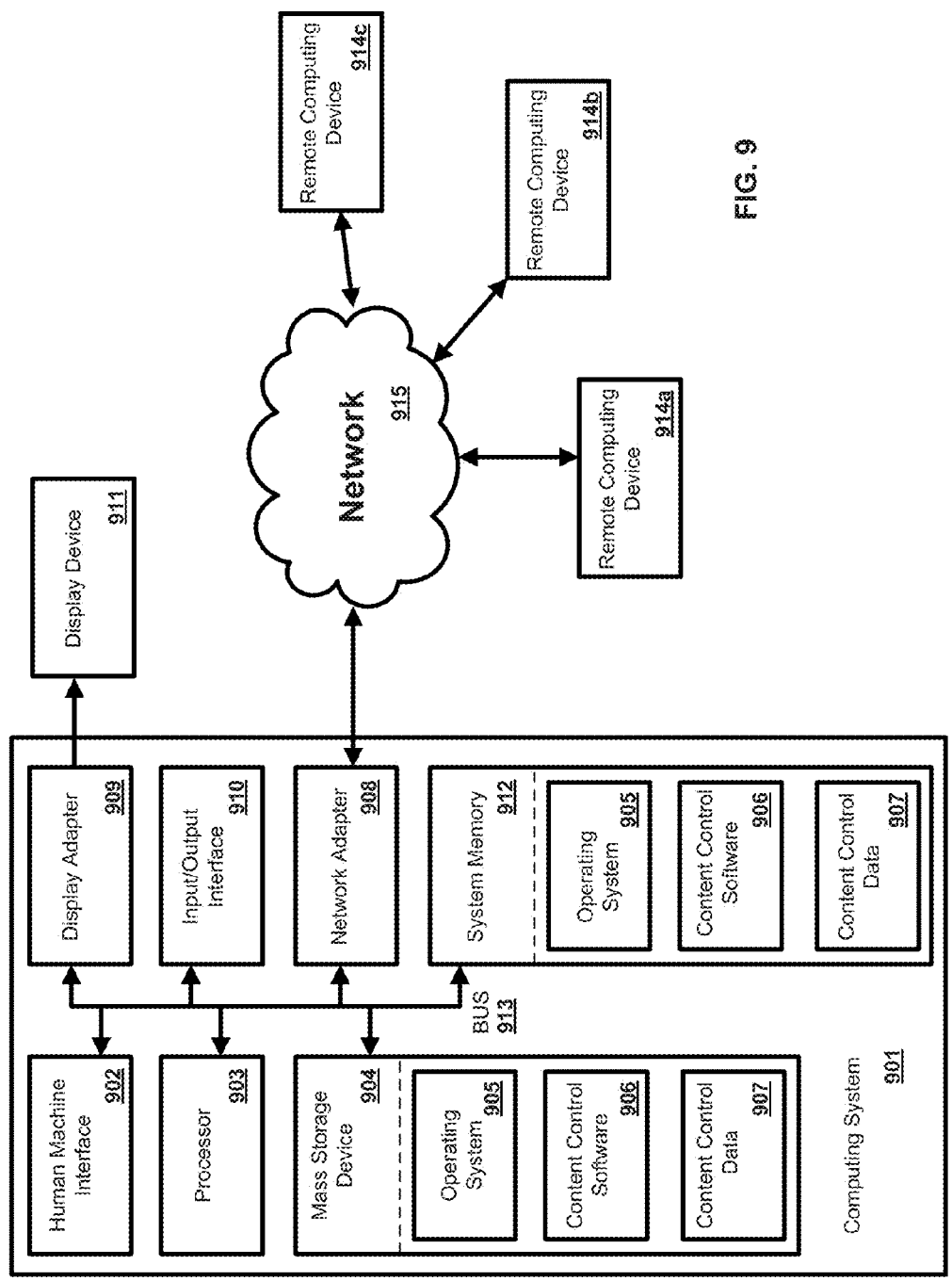
FIG. 9 is a block diagram of an exemplary computing system.

FIG. 9 is a block diagram illustrating an exemplary operating environment for performing the disclosed methods. One skilled in the art will appreciate that provided herein is a functional description and that the respective functions can be performed by software, hardware, or a combination of software and hardware. This exemplary operating environment is only an example of an operating environment and is not intended to suggest any limitation as to the scope of use or functionality of operating environment architecture. Neither should the operating environment be interpreted as having any dependency or requirement relating to any one or combination of components illustrated in the exemplary operating environment.

The present methods and systems can be operational with numerous other general purpose or special purpose computing system environments or configurations. Examples of well known computing systems, environments, and/or configurations that can be suitable for use with the systems and methods comprise, but are not limited to, personal computers, server computers, laptop devices, custom-built hardware and multiprocessor systems. Additional examples comprise set top boxes, programmable consumer electronics, network PCs, minicomputers, mainframe computers, and/or distributed computing environments that comprise any of the above systems or devices.

The processing of the disclosed methods and systems can be performed by software components. The disclosed systems and methods can be described in the general context of computer-executable instructions, such as program modules, being executed by one or more computers or other devices. Generally, program modules comprise computer code, routines, programs, objects, components, data structures, etc. that perform particular tasks or implement particular abstract data types. The disclosed methods can also be practiced in grid-based, cloud computing and distributed computing environments where tasks are performed by remote processing devices that are linked through a communications network. In a distributed computing environment, program modules can be located in both local and remote computer storage media including memory storage devices.

Further, one skilled in the art will appreciate that the systems and methods disclosed herein can be implemented via a general-purpose computing device in the form of a computing system 901. The components of the computing system 901 can comprise, but are not limited to, one or more processors or processing units 903, a system memory 912, and a system bus 913 that couples various system components including the processor 903 to the system memory 912. In the case of multiple processing units 903, the system can utilize parallel computing. Other components such as hardware acceleration cards, pci-e card or external devices can be included.

The system bus 913 represents one or more of several possible types of bus structures, including a memory bus or memory controller, a peripheral bus, an accelerated graphics port, and a processor or local bus using any of a variety of bus architectures. By way of example, such architectures can comprise an Industry Standard Architecture (ISA) bus, a Micro Channel Architecture (MCA) bus, an Enhanced ISA (EISA) bus, a Video Electronics Standards Association (VESA) local bus, an Accelerated Graphics Port (AGP) bus, and a Peripheral Component Interconnects (PCI), a PCI-Express bus, a Personal Computer Memory Card Industry Association (PCMCIA), Universal Serial Bus (USB) and the like. The bus 913, and all buses specified in this description can also be implemented over a wired or wireless network connection and each of the subsystems, including the processor 903, a mass storage device 904, an operating system 905, content control software 906, content control data 907, a network adapter 908, system memory 912, an Input/Output Interface 910, a display adapter 909, a display device 911, and a human machine interface 902, can be contained within one or more remote computing devices 914*a,b,c* at physically separate locations, connected through buses of this form, in effect implementing a fully distributed system.

The computing system 901 typically comprises a variety of computer readable media. Exemplary readable media can be any available media that is accessible by the computing system 901 and comprises, for example and not meant to be limiting, both volatile and non-volatile media, removable and non-removable media. The system memory 912 comprises computer readable media in the form of volatile memory, such as random access memory (RAM), and/or non-volatile memory, such as read only memory (ROM). The system memory 912 typically contains data such as content control data 907 and/or program modules such as operating system 905 and content control software 906 that are immediately accessible to and/or are presently operated on by the processing unit 903.

In another aspect, the computing system 901 can also comprise other removable/non-removable, volatile/non-volatile computer storage media. By way of example, FIG. 9 illustrates a mass storage device 904 which can provide non-volatile storage of computer code, computer readable instructions, data structures, program modules, and other data for the computing system 901. For example and not meant to be limiting, a mass storage device 904 can be a hard disk, a removable magnetic disk, a removable optical disk, magnetic cassettes or other magnetic storage devices, flash memory cards, CD-ROM, digital versatile disks (DVD) or other optical storage, random access memories (RAM), read only memories (ROM), electrically erasable programmable read-only memory (EEPROM), and the like.

Optionally, any number of program modules can be stored on the mass storage device 904, including by way of example, an operating system 905 and content control software 906. Each of the operating system 905 and content control software 906 (or some combination thereof) can comprise elements of the programming and the content control software 906. Content control data 907 can also be stored on the mass storage device 904. Content control data 907 can be stored in any of one or more databases known in the art. Examples of such databases comprise, DB2®, Microsoft® Access, Microsoft® SQL Server, Oracle®, mySQL, PostgreSQL, and the like. The databases can be centralized or distributed across multiple systems. In an aspect, content control data 907 can comprise information relating to events, event notifiers, placement spots, alternate programming, programming blackout, advertisements, and the like. As an example, the content control data can comprise information relating to a particular programming being transmitted to a user location. As a further example, the content control data can comprise information and instructions related to processing placement signals and updating content being transmitted to a user location. However, other information can be associated with the content control data, such as information about the subscriber consuming the content including location, device type, and subscription information, and information relating the content for blackouts including blackout locations and alternative content associated with the blackout.

In another aspect, the user can enter commands and information into the computing system 901 via an input device (not shown). Examples of such input devices comprise, but are not limited to, a keyboard, pointing device (e.g., a "mouse"), a microphone, a joystick, a scanner, tactile input devices such as gloves, and other body coverings, and the like These and other input devices can be connected to the processing unit 903 via a human machine interface 902 that is coupled to the system bus 913, but can be connected by other interface and bus structures, such as a parallel port, game port, an IEEE 1394 Port (also known as a Firewire port), a serial port, or a universal serial bus (USB).

In yet another aspect, a display device 911 can also be connected to the system bus 913 via an interface, such as a display adapter 909. It is contemplated that the computing system 901 can have more than one display adapter 909 and the computing system 901 can have more than one display device 911. For example, a display device can be a monitor, an LCD (Liquid Crystal Display), or a projector. In addition to the display device 911, other output peripheral devices can comprise components such as speakers (not shown) and a printer (not shown) which can be connected to the computing system 901 via Input/Output Interface 910. Any step and/or result of the methods can be output in any form to an output device. Such output can be any form of visual representation, including, but not limited to, textual, graphical, animation, audio, tactile, and the like. The display 911 and computing system 901 can be part of one device, or separate devices.

The computing system 901 can operate in a networked environment using logical connections to one or more remote computing devices 914a,b,c. By way of example, a remote computing device can be a personal computer, portable computer, smartphone, a server, a router, a network computer, a peer device or other common network node, and so on. Logical connections between the computing system 901 and a remote computing device 914a,b,c can be made via a network 915, such as a local area network (LAN) and/or a general wide area network (WAN). Such network connections can be through a network adapter 908. A network adapter 908 can be implemented in both wired and wireless environments. Such networking environments are conventional and commonplace in dwellings, offices, enterprise-wide computer networks, intranets, and the Internet.

For purposes of illustration, application programs and other executable program components such as the operating system 905 are illustrated herein as discrete blocks, although it is recognized that such programs and components reside at various times in different storage components of the computing system 901, and are executed by the data processor(s) of the computer. An implementation of content control software 906 can be stored on or transmitted across some form of computer readable media. Any of the disclosed methods can be performed by computer readable instructions embodied on computer readable media. Computer readable media can be any available media that can be accessed by a computer. By way of example and not meant to be limiting, computer readable media can comprise "computer storage media" and communications media. "Computer storage media" comprise volatile and non-volatile, removable and non-removable media implemented in any methods or technology for storage of information such as computer readable instructions, data structures, program modules, or other data. Exemplary computer storage media comprises, but is not limited to, RAM, ROM, EEPROM, flash memory or other memory technology. CD-ROM, digital versatile disks (DVD) or other optical storage, magnetic cassettes, magnetic tape, magnetic disk storage or other magnetic storage devices, or any other medium which can be used to store the desired information and which can be accessed by a computer.

The methods and systems can employ artificial intelligence (AI) techniques such as machine learning and iterative learning. Examples of such techniques include, but are not limited to, expert systems, case based reasoning, Bayesian networks, behavior based AI, neural networks, fuzzy systems, evolutionary computation (e.g. genetic algorithms), swarm intelligence (e.g. ant algorithms), and hybrid intelligent systems (e.g. expert inference rules generated through a neural network or production rules from statistical learning).

While the methods and systems have been described in connection with preferred embodiments and specific examples, it is not intended that the scope be limited to the particular embodiments set forth, as the embodiments herein are intended in all respects to be illustrative rather than restrictive.

Unless otherwise expressly stated, it is in no way intended that any method set forth herein be construed as requiring that its steps be performed in a specific order. Accordingly, where a method claim does not actually recite an order to be followed by its steps or it is not otherwise specifically stated in the claims or descriptions that the steps are to be limited to a specific order, it is no way intended that an order be inferred, in any respect. This holds for any possible non-express basis for interpretation, including: matters of logic with respect to arrangement of steps or operational flow; plain meaning derived from grammatical organization or punctuation; the number or type of embodiments described in the specification.

It will be apparent to those skilled in the art that various modifications and variations can be made without departing from the scope or spirit. Other embodiments will be apparent to those skilled in the art from consideration of the specification and practice disclosed herein. It is intended that the specification and examples be considered as exemplary only, with a true scope and spirit being indicated by the following claims.

What is claimed is:

1. A method comprising:
   receiving, by a decoder, a video transmission comprising a plurality of video frames in a first format;
   receiving, by a layout engine, content data comprising a first portion associated with the video transmission and a second portion comprising a plurality of content components;
   determining, by the layout engine, context description data associated with the first portion and the second portion of the content data, wherein the context description data comprises location information for the content data in relation to an initial video frame of the plurality of video frames;
   determining, by the layout engine, a portion of the initial video frame of the plurality of video frames to be converted to an intermediate format, a state of at least one of the plurality of content components based on the context description data, and a level of processing for converting the portion of the initial video frame;

converting, by the decoder, the portion of the initial video frame and the at least one of the plurality of content components to the intermediate format based on the context description data;

modifying, by an encoder, the portion of the initial video frame in the intermediate format to incorporate the first portion of the content data associated with the video transmission into the portion of the initial video frame;

updating, by the encoder, the state of at the least one of the plurality of content components based on the context description data; and converting, by the encoder, the portion of the initial video frame from the intermediate format with the first portion of the content data associated with the video transmission to a second format and the at least one of the plurality of content components from the intermediate format to the second format, wherein the portion of the initial video frame and the at least one of the plurality of content components are incorporated into a final video frame based at least in part upon the context description data and the level of processing.

2. The method of claim 1, wherein the first format is hypertext markup language.

3. The method of claim 1, wherein converting, by the encoder, the portion of the initial video frame from the intermediate format with the first portion of the content data associated with the video transmission to the second format comprises encoding the portion of the initial video frame in the intermediate format to the first format.

4. The method of claim 1, wherein the second format is MPEG.

5. The method of claim 1, wherein the content data comprises one or more of a text, an image, a vector, a highlight, an animation, a video, or an overlay.

6. The method of claim 1, wherein the context description data comprises one or more of a component list, location information, movement information, a vector operation, or an excluded region.

7. The method of claim 1, wherein converting, by the encoder, the portion of the initial video frame from the intermediate format with at least the first portion of the content data associated with the video transmission to the second format comprises encoding supplement content data with the final video frame in the second format.

8. The method of claim 1, further comprising rendering, by a computing device, the final video frame having the second format.

9. A method comprising:
receiving, by a decoder, a video transmission comprising a plurality of video frames in a first format;
receiving, by a layout engine, content data comprising a first portion associated with the video transmission and a second portion comprising a plurality of content components;
receiving, by the decoder via the layout engine, the content data comprising the first portion associated with the video transmission;
receiving, by the decoder, a decoding extent determined by the layout engine for decoding a portion of an initial video frame of the plurality of video frames of the video transmission,
wherein the decoding extent comprises context description data associated with the content data and a level of processing of the portion of the initial video frame based on the context description data;

decoding, by the decoder, the portion of the initial video frame in the first format to an intermediate format based on the decoding extent;

encoding, by an encoder, at least one content component of the plurality of content components to the intermediate format based on the content description data;

combining, by the encoder, the first portion of the content data associated with the video transmission with the portion of the initial video frame in the intermediate format; and encoding, by the encoder, the portion of the initial video frame and the at least one content component of the plurality of content components from the intermediate format to the first format, wherein the portion of the initial video frame and the at least one of the plurality of content components are incorporated into a final video frame based at least in part upon the context description data and the level of processing.

10. The method of claim 9, wherein the first format is hypertext markup language.

11. The method of claim 9, wherein the context description data comprises one or more of a component list, location information, movement information, a vector operation, or an excluded region.

12. The method of claim 9, wherein decoding, by the decoder, the portion of the initial video frame in the first format to an intermediate format comprises decoding only the portion of the initial video frame having the first format based on the decoding extent.

13. A method comprising:
receiving, by a layout engine, a video transmission comprising a plurality of video frames in a first format;
receiving, by the layout engine, content data comprising a first portion associated with the video transmission in the first format and a second portion comprising a plurality of content components in the first format;
determining, by the layout engine, context description data relating to the first portion of content data associated with the video transmission in the first format, wherein the context description data comprises location information of the first portion of content data in relation to a portion of an initial video frame of the plurality of video frames;
formatting, by the layout engine, the first portion of the content data to convert from the first format to an intermediate format;
determining, by the layout engine, based on the context description data, a level of processing by an encoding device for the portion of the initial video frame;
formatting, by the layout engine, the at least one of the plurality of content components to the intermediate format;
transmitting, by the layout engine, the context description data and the first portion of the content data in the intermediate format to the encoding device, wherein the encoding device processes the portion of the initial video frame based at least in part upon the context description data and the level of processing; and
transmitting, by the layout engine, the at least one of the plurality of content components in the intermediate format to the encoding device to be combined with the portion of the initial video frame and the first portion of content data.

14. The method of claim 13, wherein the first format is hypertext markup language.

15. The method of claim 13, wherein the content data comprises one or more of a text, an image, a vector, a highlight, an animation, a video, or an overlay.

16. The method of claim 13, wherein the context description data comprises one or more of a component list, location information, movement information, a vector operation, or an excluded region.

17. The method of claim 9, wherein the content data comprises one or more of a text, an image, a vector, a highlight, an animation, a video, or an overlay.

18. The method of claim 9, further comprising transmitting, by the encoder, the video transmission in the first format, wherein the video transmission comprises the portion of the initial video frame combined with the at least one plurality of content components in a final video frame.

\* \* \* \* \*